United States Patent
Yum et al.

(10) Patent No.: US 12,149,320 B2
(45) Date of Patent: Nov. 19, 2024

(54) APPARATUS FOR RECEIVING/TRANSMITTING DOWNLINK SIGNALS IN WIRELESS COMMUNICATION SYSTEM AND OPERATING METHOD THEREOF

(71) Applicant: SAMSUNG ELECTRONICS CO., LTD., Suwon-si (KR)

(72) Inventors: Kunil Yum, Seoul (KR); Yangsoo Kwon, Seoul (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/734,259

(22) Filed: May 2, 2022

(65) Prior Publication Data

US 2022/0352970 A1 Nov. 3, 2022

(30) Foreign Application Priority Data

Sep. 8, 2021 (KR) .......................... 10-2021-0119856

(51) Int. Cl.
*H04B 7/08* (2006.01)
*H04B 7/06* (2006.01)
*H04W 72/23* (2023.01)

(52) U.S. Cl.
CPC ......... *H04B 7/0874* (2013.01); *H04B 7/0617* (2013.01); *H04W 72/23* (2023.01)

(58) Field of Classification Search
CPC .. H04B 7/0874; H04B 7/0617; H04B 7/0686; H04B 7/08; H04W 72/23; H04W 8/245; H04W 8/24; H04W 16/28

USPC ........................................................ 375/267
See application file for complete search history.

(56) References Cited

U.S. PATENT DOCUMENTS

| | | | |
|---|---|---|---|
| 9,425,876 B2 | 8/2016 | Yu et al. | |
| 10,230,440 B2 | 3/2019 | Kim et al. | |
| 10,367,558 B2 | 7/2019 | Frank et al. | |
| 10,715,241 B2 | 7/2020 | Islam et al. | |
| 10,812,168 B2 | 10/2020 | Kim et al. | |
| 10,897,298 B2 | 1/2021 | Kang et al. | |

(Continued)

FOREIGN PATENT DOCUMENTS

| | | |
|---|---|---|
| WO | 2020-030010 B2 | 2/2020 |
| WO | 2020-060339 A1 | 3/2020 |
| WO | 2020-229976 A1 | 11/2020 |

OTHER PUBLICATIONS

Communication dated Jan. 13, 2023 issued by the European Patent Office in counterpart European Patent Application No. 22170923.1.

(Continued)

*Primary Examiner* — Fitwi Y Hailegiorgis
(74) *Attorney, Agent, or Firm* — Sughrue Mion, PLLC

(57) ABSTRACT

An operating method of a base station includes receiving, from a terminal, a user equipment (UE) capability signal including panel-related information of the terminal, determining whether to generate a panel change signal based on the panel-related information, determining a panel change of the terminal based on the panel-related information when it is determined to generate the panel change signal, and transmitting, to the terminal, the panel change signal including information regarding the panel change.

19 Claims, 12 Drawing Sheets

(56) References Cited

U.S. PATENT DOCUMENTS

| | | |
|---|---|---|
| 10,998,949 B2 | 5/2021 | Faxer et al. |
| 11,463,953 B2 | 10/2022 | Guan et al. |
| 2020/0344686 A1 | 10/2020 | Venugopal et al. |
| 2020/0350976 A1 | 11/2020 | Bai et al. |
| 2020/0359197 A1 | 11/2020 | Venugopal et al. |
| 2021/0051710 A1 | 2/2021 | Cirik et al. |
| 2021/0119688 A1 | 4/2021 | Enescu et al. |
| 2021/0351888 A1 | 11/2021 | Park et al. |
| 2021/0410130 A1* | 12/2021 | Rahman ............ H04B 7/06968 |

OTHER PUBLICATIONS

European Search Report issued Sep. 22, 2022 by the European Patent Office in EP Patent Application No. 22170923.1.

\* cited by examiner ically, to an apparatus for receiving/transmitting a downlink signal during conversion of a reception panel of a terminal device and an operating method of the apparatus.
APPARATUS FOR RECEIVING/TRANSMITTING DOWNLINK SIGNALS IN WIRELESS COMMUNICATION SYSTEM AND OPERATING METHOD THEREOF

CROSS-REFERENCE TO RELATED APPLICATIONS

This application is based on and claims priority under 35 U.S.C. § 119 to Korean Patent Application No. 10-2021-0057476, filed on May 3, 2021, and to Korean Patent Application No. 10-2021-0119856, filed on Sep. 8, 2021, in the Korean Intellectual Property Office, the disclosures of which are incorporated by reference herein in their entireties.

BACKGROUND

The present disclosure relates to wireless communication, and more particularly, to an apparatus for receiving/transmitting a downlink signal during conversion of a reception panel of a terminal device and an operating method of the apparatus.

To satisfy the demand for increasing wireless data traffic after the commercialization of the $4^{th}$ generation (4G) communication systems, attempts have been made to develop improved 5G communication systems or pre-5G communication systems. Thus, a 5G communication system or a pre-5G communication system is referred to as a 'beyond 4G network communication system' or a 'post Long-Term Evolution (LTE).'

In order to achieve a high data transfer rate, the implementation of a 5G communication system in a super-high frequency band (e.g., a millimeter wave (mmWave) band such as for example a 60 GHz band) has been considered. To reduce the path loss of radio waves in such a super-high frequency band and to increase a transmission distance of radio waves, various technologies, for example, beamforming, massive multiple-input multiple-output (MIMO), full dimensional MIMO (FD-MIMO), array antennas, analog beamforming, digital beamforming, hybrid beamforming, and large scale antennas are under discussion for 5G communication systems.

SUMMARY

It is an aspect to provide a method of stably receiving/transmitting signals from/to a base station when a reception panel is changed in a terminal device.

According to an aspect of one or more embodiments, there is provided an operating method of a base station, the operating method comprising receiving, from a terminal, a user equipment (UE) capability signal comprising panel-related information of the terminal; determining whether to generate a panel change signal based on the panel-related information; determining a panel change of the terminal based on the panel-related information, when it is determined to generate the panel change signal; and transmitting, to the terminal, the panel change signal comprising information regarding the panel change.

According to another aspect of one or more embodiments, there is provided an operating method of a terminal, the operating method comprising transmitting, to a base station, a UE capability signal comprising panel-related information of the terminal; receiving, from the base station, a panel change signal comprising index information to indicate a panel to be changed and information regarding a panel change gap; and changing a reception panel that is activated in the panel change gap, based on the panel change signal, wherein the information regarding the panel change gap comprises information to instruct a start point in time at which the terminal starts a panel change, and a termination point in time of the panel change, or length information regarding the start point in time and a gap required for the panel change.

According to yet another aspect of one or more embodiments, there is provided an operating method of a terminal, the operating method comprising bypassing transmitting a UE capability signal, which comprises panel-related information of the terminal, to a base station; receiving, from the base station, a beam change signal comprising a transmission beam change; determining whether there is a need for a panel change, in response to the beam change signal; and when it is determined that the panel change is required, performing the panel change and transmitting a panel change complete signal to the base station, wherein the beam change signal is used to instruct, the base station, to change a transmission beam from a first transmission beam to a second transmission beam.

receiving, from a base station, a beam change signal comprising a transmission beam change; determining whether a panel change is required, in response to the beam change signal; and when it is determined that the panel change is required, performing the panel change and transmitting a panel change complete signal to the base station.

BRIEF DESCRIPTION OF THE DRAWINGS

Various embodiments will be more clearly understood from the following detailed description taken in conjunction with the accompanying drawings, in which.

DETAILED DESCRIPTION

Hereinafter, various embodiments will be described in detail with reference to the attached drawings.

Figure 1:
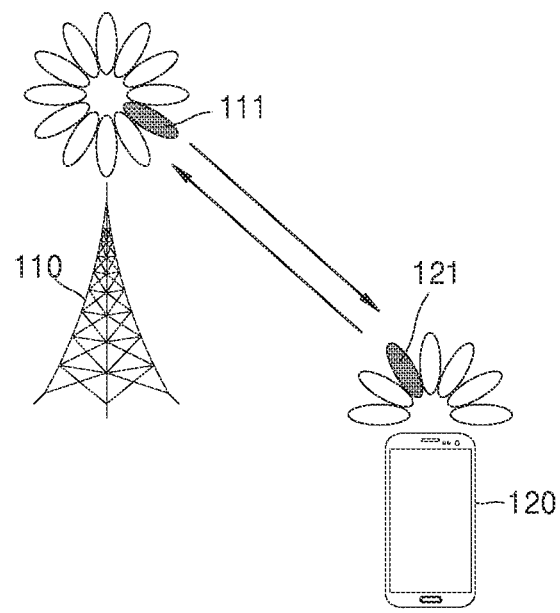
FIG. 1 illustrates a wireless communication system according to example embodiments.

FIG. 1 illustrates a wireless communication system according to example embodiments.

FIG. 1 illustrates a base station 110 and an electronic device 120. The base station 110 and the electronic device 120 may be illustrated as nodes using a wireless channel in the wireless communication system.

The base station 110 may be a network infrastructure that provides a wireless connection to the electronic device 120. The base station 110 may have a coverage defined as a certain geographical area, based on a distance in which signals may be transmitted. The term "base station 110" may be replaced with a term such as "an access point (AP)," "an eNodeB (eNB)," "a 5$^{th}$ generation (5G) node," or "a wireless point" or other terms having the same technical meaning as the term "base station."

According to various embodiments, the base station 110 may be connected to at least one "transmission/reception point (TRP)." The base station 110 may transmit a downlink signal to or receive an uplink signal from the electronic device 120 through the at least one TRP.

The electronic device 120 may be used by users and may communicate with the base station 110 through a wireless channel. The electronic device 120 may be replaced with a term such as "a terminal," "a user equipment (UE)," "a mobile station," "a subscriber station," "a customer premises equipment (CPE)," "a remote terminal," "a wireless terminal," or "a user device" or other terms having the same technical meaning as the term electronic device.

The base station 110 and the electronic device 120 may transmit and receive wireless signals in a millimeter-wave (mmWave) band (e.g., 28 GHz, 30 GHz, 38 GHz, or 60 GHz). Millimeter waves tend to have high attenuation. To overcome a high attenuation characteristic of millimeter waves, the base station 110 and the electronic device 120 may perform beamforming. Here, the beamforming may include transmission beamforming and reception beamforming. That is, the base station 110 and the electronic device 120 may provide directivity to a transmission signal or a reception signal. To this end, the base station 110 and the electronic device 120 may select an optimum beam for wireless communication through beam search, beam training, or beam management. For example, the base station 110 may select an optimum beam 111 and the electronic device 120 may select an optimum beam 121 for a given wireless communication between the base station 110 and the electronic device 120.

Figure 2:
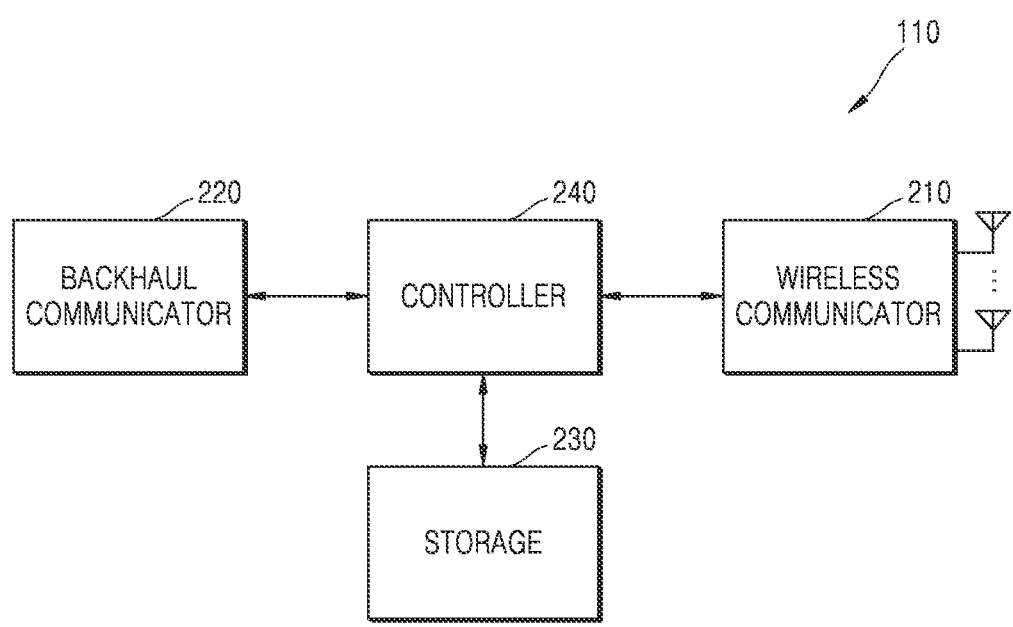
FIG. 2 is a block diagram of a base station according to example embodiments.

FIG. 2 is a block diagram of a base station according to example embodiments.

Referring to FIG. 2, the base station 110 may include a wireless communicator 210, a backhaul communicator 220, a storage 230, and a controller 240.

The wireless communicator 210 may perform functions for transmitting/receiving signals through a wireless channel. According to an embodiment, the wireless communicator 210 may perform a conversion function that converts between baseband signals and bit strings, according to the physical layer specification of a system. For example, the wireless communicator 210 may generate complex symbols by encoding and modulating transmission bit strings during the data transmission and may restore reception bit strings by demodulating and decoding the baseband signals during the data reception. Also, the wireless communicator 210 may up-convert a baseband signal into a radio frequency (RF) band signal and transmit the RF band signal through an antenna or may down-convert the RF band signal, which is received through the antenna, into a baseband signal. To this end, the wireless communicator 210 may include a transmission filter, a reception filter, an amplifier, a mixer, an oscillator, a digital to analog converter (DAC), an analog to digital converter (ADC), and the like.

The wireless communicator 210 may receive/transmit signals. For example, the wireless communicator 210 may transmit a synchronization signal, a reference signal, system information, a message, control information, data, or the like. Also, the wireless communicator 210 may perform beamforming. The wireless communicator 210 may apply a beamforming weight to signals to provide the directivity to signals to be transmitted/received. The wireless communicator 210 may repeatedly transmit a signal by changing a generated beam.

The backhaul communicator 220 may provide an interface to communicate with other nodes in a network. That is, the backhaul communicator 220 may convert bit strings, which are transmitted to other nodes, for example, to other connection nodes, other base stations, upper-level nodes, a core network, or the like, and may convert the physical signals from other nodes into bit strings.

The storage 230 may store data such as basic programs, application programs, and configuration information for the operation of the base station 110. The storage 230 may be volatile memory, non-volatile memory, or a combination thereof. The controller 240 may control operations of the base station 110. For example, the controller 240 may transmit and receive signals through the wireless communicator 210 or the backhaul communicator 220. Also, the controller 240 may record and read data in and from the storage 230. To this end, the controller 240 may include at least one processor, e.g., at least one microprocessor or at least one central processing unit (CPU).

Figure 3A:
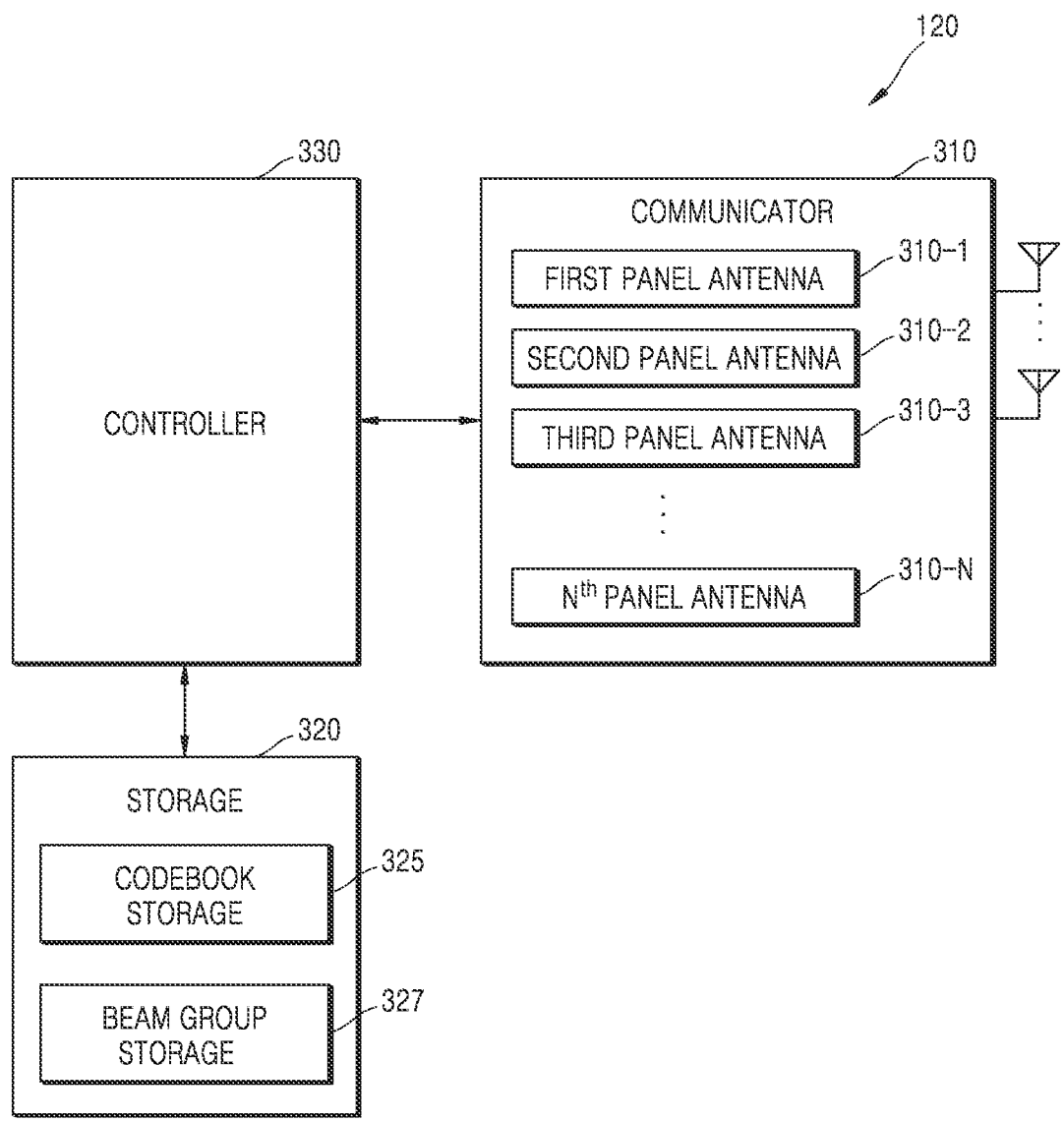
FIG. 3A is a block diagram of an electronic device according to example embodiments.

FIG. 3A is a block diagram of an electronic device according to example embodiments.

Referring to FIG. 3A, the electronic device 120 may include a communicator 310, a storage 320, and a controller 330.

The communicator 310 may perform functions for receiving/transmitting signals through a wireless channel. The communicator 310 performs a conversion function that converts between baseband signals and bit strings, according to the physical layer specification of a system. For example, the communicator 310 may generate complex symbols by encoding and modulating transmission bit strings during the data transmission and may restore reception bit strings by demodulating and decoding the baseband signals during the data reception. Also, the communicator 310 may up-convert a baseband signal into an RF band signal and transmit the RF band signal through an antenna or may down-convert the RF band signal, which is received through the antenna, into a baseband signal. For example, the communicator 310 may include a transmission filter, a reception filter, an amplifier, a mixer, an oscillator, a DAC, an ADC, and the like. The communicator 310 may perform beamforming. The communicator 310 may apply a beamforming weight to a signal to provide the directivity to a signal to be transmitted/received. According to various embodiments, the communicator 310 may include a plurality of panel antennas. For example, the communicator 310 may include a first panel antenna 310-1, a second panel antenna 310-2, a third panel antenna 310-3, to an Nth panel antenna 310-N. The plurality of panel antennas 310-1 to 310-N may include array antennas and may be arranged at various locations of the electronic device 120.

The communicator 310 may receive/transmit signals. The communicator 310 may receive a downlink signal. The downlink signal may include a synchronization signal (SS), a reference signal (RS), system information, a configuration message, control information, downlink data, or the like. Also, the communicator 310 may transmit an uplink signal. The uplink signal may include a random access-related signal or a reference signal (e.g., a Sounding Reference Signal (SRS) or demodulate (DM)-RS), uplink data, or the like.

The storage 320 may store data such as basic programs, application programs, and configuration information to operate the electronic device 120. The storage 320 may be volatile memory, non-volatile memory, or a combination thereof. The storage 320 may provide the stored data according to a request from the controller 330. According to various embodiments, the storage 320 may include a codebook storage 325 in which information regarding a plurality of codebooks are stored. The codebook storage 325 may store, in advance, information such as a beamforming weight to allow at least one panel antenna, which is selected for wireless communication from among the plurality of panel antennas 310-1 to 310-N, to optimally perform the beamforming. According to various embodiments, the storage 320 may further include a beam group storage 327. The beam group storage 327 may include information regarding beams that may be formed in respective panel antennas. For example, when the first panel antenna 310-1 may form a first beam, a second beam, and a third beam, and when the second panel antenna 310-2 may form a fourth beam, a fifth beam, and a sixth beam, the beam group storage 327 may store, in advance, information regarding the beams that may be respectively generated by the first and second panel antennas 310-1 and 310-2 in a lookup table form.

The controller 330 may control all operations of the electronic device 120. For example, the controller 330 may transmit and receive signals through the communicator 310. Also, the controller 330 may record and read data in and from the storage 320. The controller 330 may include at least one processor or at least one microprocessor, or may be part of a processor. When the controller 330 is part of a processor, part of the communicator 310 and the controller 330 may be referred to as a communication processor (CP).

Figure 3B:
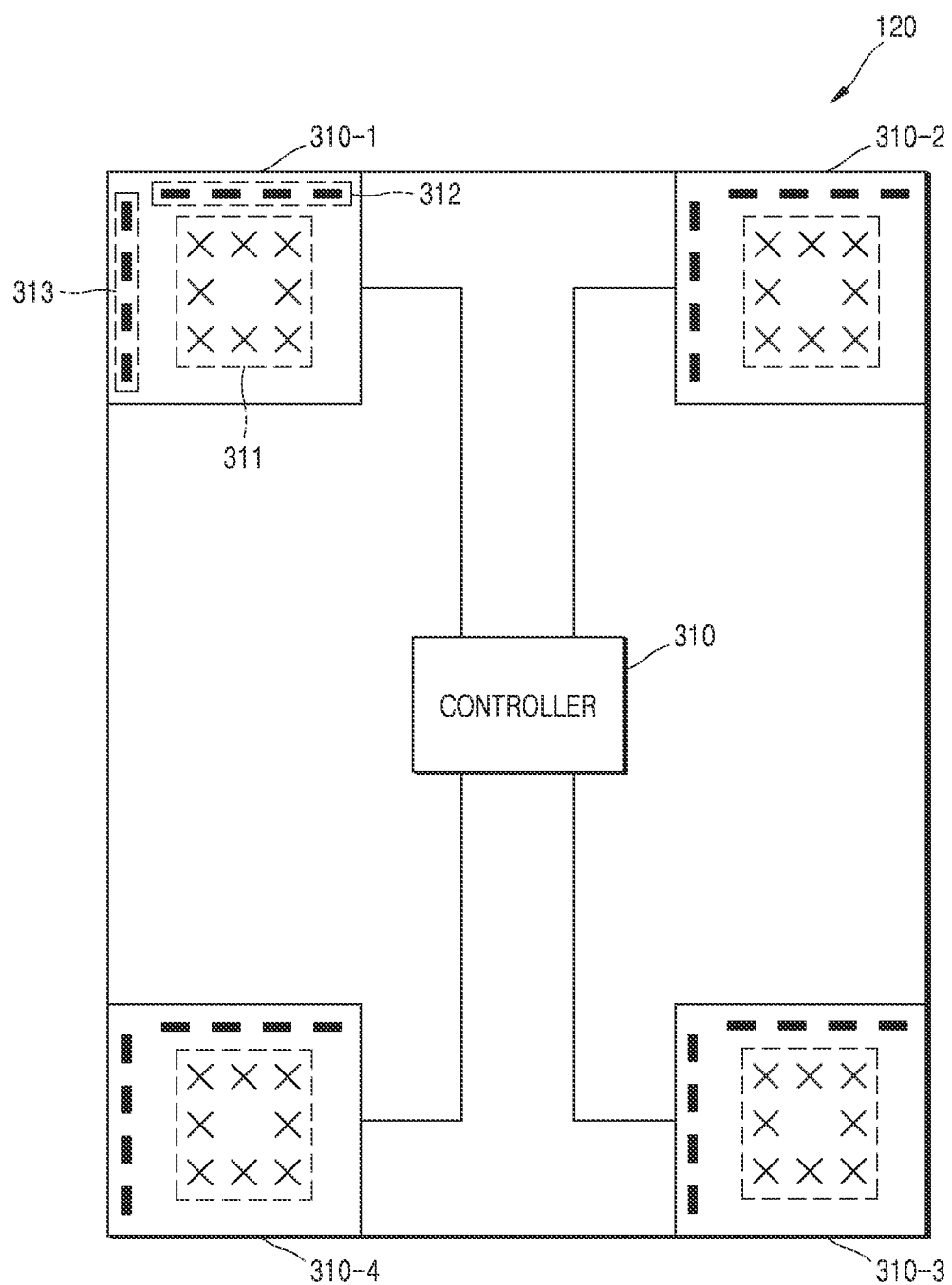
FIG. 3B is an example of a layout of panel antennas according to example embodiments.

FIG. 3B is an example of a layout of panel antennas according to example embodiments.

Referring to FIG. 3B, the electronic device 120 may include the plurality of panel antennas 310-1 to 310-N. For example, the electronic device 120 may include the first panel antenna 310-1, the second panel antenna 310-2, the third panel antenna 310-3, and a fourth panel antenna 310-4 arranged in respective corners of the electronic device 120.

Each of the first to fourth panel antennas 310-1 to 310-4 may include a plurality of array antennas. For example, the first panel antenna 310-1 may include a first array antenna 311, a second array antenna 312, and a third array antenna 313. In some embodiments, the array antennas included in the same panel antenna may be of different types. For example, the first array antenna 311 may correspond to a patch array, and the second array antenna 312 and the third array antenna 313 may correspond to dipole arrays. The second array antenna 312 and the third array antenna 313 may respectively form beams in lateral directions, and the first array antenna 311 may form a beam in a direction perpendicular to a plane of the electronic device 120.

Each array antenna may include antenna elements. Elements included in the second array antenna 312 and the third array antenna 313 may respectively correspond to dipole antenna elements (e.g., schematically illustrated by bold dashes in FIG. 3B), and elements included in the first array antenna 311 may respectively correspond to patch antenna elements (e.g., schematically illustrated by Xs in FIG. 3B).

In the embodiment illustrated in FIG. 3B, the array antennas and the antenna elements are described based on the dipole antennas and the patch antennas, but embodiments are not limited thereto. Also, in the embodiment illustrated in FIG. 3B, four panel antennas 310-1 to 310-4 respectively arranged in the corners of the electronic device 120 are described, but the panel antennas (e.g., a $K^{th}$ panel to an $N^{th}$ panel) may be further arranged.

Figure 4:
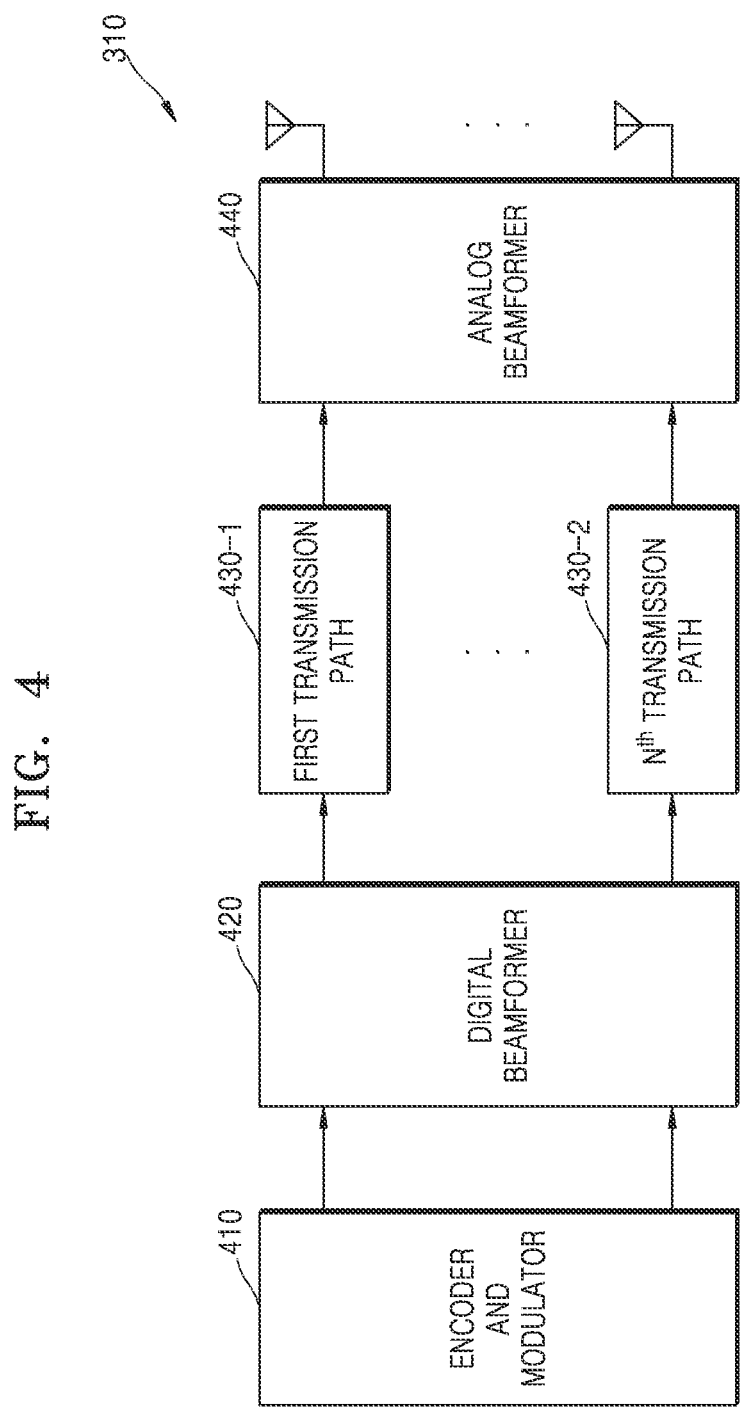
FIG. 4 is a block diagram of a communicator according to example embodiments.

FIG. 4 is a block diagram of a communicator according to example embodiments.

According to various embodiments, FIG. 4 illustrates an example of a detailed configuration of the communicator 310 of FIG. 3A. Referring to FIG. 4, the communicator 310 may include an encoder and modulator 410, a digital beamformer 420, a first transmission path 430-1 to an $N^{th}$ transmission path 430-N, and an analog beamformer 440.

The encoder and modulator 410 performs channel encoding. For the channel encoding, at least one of a low density parity check (LDPC) code, a convolution code, and a polar code may be used. The encoder and modulator 410 generates modulation symbols by performing constellation mapping.

The digital beamformer 420 performs the beamforming on digital signals (e.g., modulation symbols). For example, the digital beamformer 420 may multiply the modulation symbols and beamforming weights. Here, the beamforming weights are used to change sizes and phases of signals and may be referred to as 'precoding matrixes,' 'precoders,' or the like. The digital beamformer 420 outputs modulation symbols that are digitally beamformed as the first to $N^{th}$ transmission paths 430-1 to 430-N. In some embodiments, according to a multiple-input multiple-output (MIMO) transmission method, the modulation symbols may be multiplexed, or in other embodiments, the same modulation symbols may be provided through the first to $N^{th}$ transmission paths 430-1 to 430-N.

In the first to Nth transmission paths 430-1 to 430-N, digital signals that are digitally beamformed are converted into analog signals. To this end, each of the first to $N^{th}$ transmission paths 430-1 to 430-N may include an inverse fast Fourier transform (IFFT) operator, a cyclic prefix (CP) inserter, a DAC, and an up-converter. The CP inserter may be configured to perform an orthogonal frequency division multiplexing (OFDM) method, and when another physical layer method (e.g., filter bank multi-carrier (FBMC)) is applied, the CP inserter may be omitted. That is, the first to $N^{th}$ transmission paths 430-1 to 430-N provide independent signal processing processes for streams that are generated through digital beamforming. Depending on an implementation method, some components of the first to $N^{th}$ transmission paths 430-1 to 430-N may be commonly used. In other words, in some embodiments, a component may be used in common by each of the first to Nth transmission paths 430-1 to 430-N. In other embodiments, the component may be provided in each of the first to Nth transmission paths 430-1 to 430-N.

The analog beamformer 440 performs beamforming on analog signals. For example, the analog beamformer 440 may multiply beamforming weights and analog signals. Here, the beamforming weights may be used to change sizes and phases of signals.

Figure 5:
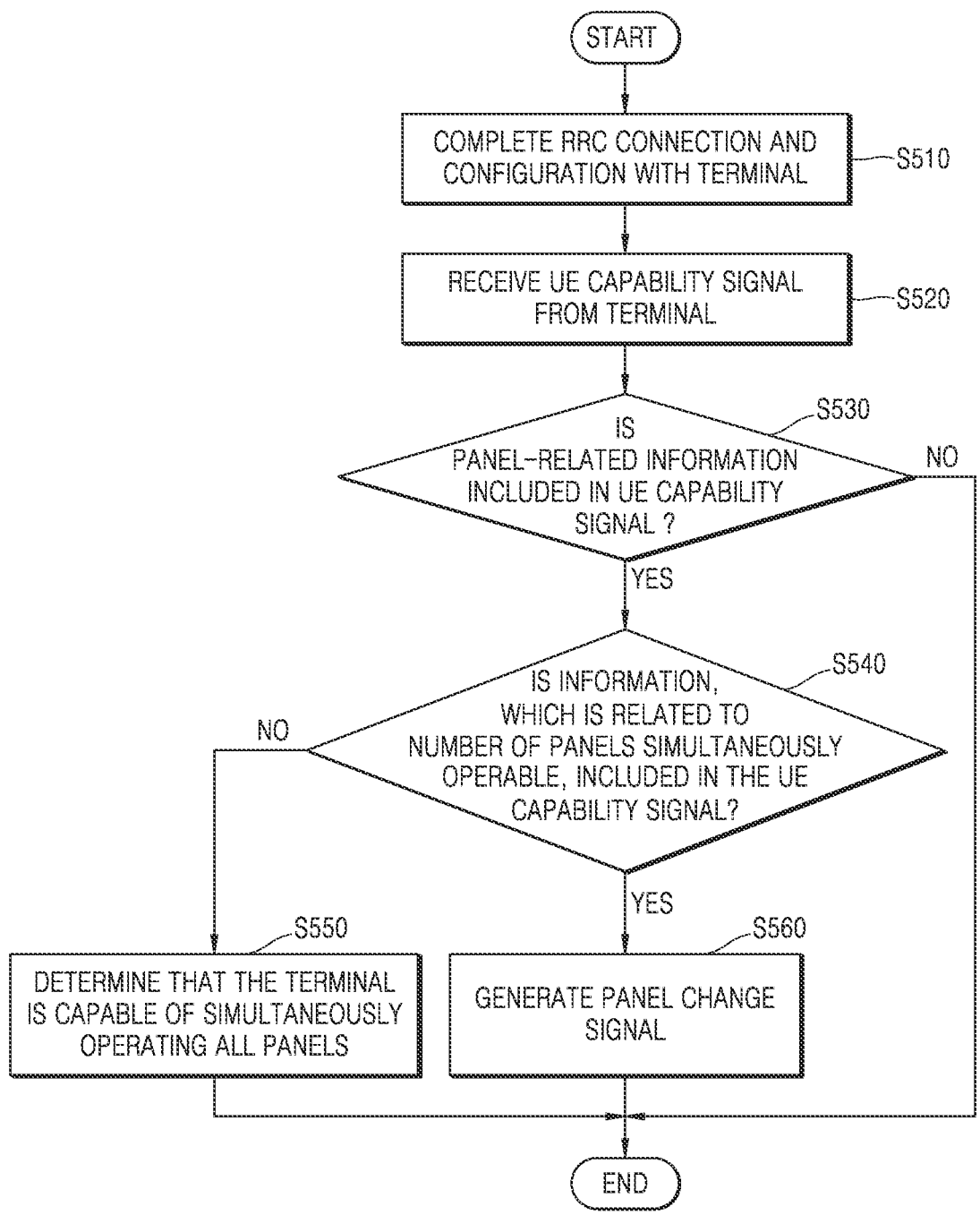
FIG. 5 is a flowchart of an operation of a base station, according to example embodiments.

FIG. 5 is a flowchart of an operation of a base station, according to example embodiments.

Referring to FIG. 5, in operation S510, the base station 110 may complete Radio Resource Control (RRC) connection and configuration with the terminal 120. For example, the terminal 120 may transmit an RRC connection request message to the base station 110 and may request the RRC connection. The base station 110 may transmit an RRC connection setup message to the terminal 120 in response to the RRC connection request message and thus assign a Signaling Radio Bearer (SRB) configuration resource for the terminal 120. The terminal 120 may complete the RRC connection by transmitting, to the base station 110, an RRC connection setup complete message.

In operation S520, the base station 110 may receive a user equipment (UE) capability signal from the terminal 120. The UE capability signal may include multiple pieces of information to generate a panel change signal. For example, the UE capability signal may include at least one of whether the terminal 120 requires a panel change gap, the number of panels included in the terminal 120, the maximum number of panels that are simultaneously operable by the terminal 120, and length information of the panel change gap.

In operation S530, the base station 110 may determine whether panel-related information is included in the UE capability signal. The panel-related information may indicate at least one of whether the terminal 120 requires a panel change gap, the number of panels included in the terminal 120, the maximum number of panels that are simultaneously operable by the terminal 120, and length information of the panel change gap.

When the panel-related information is not included in the UE capability signal (S530, NO), the operation of the base station ends. For example, according to an embodiment, the base station 110 may not obtain the panel-related information as a result of receiving the UE capability signal from the terminal 120 and decoding the same. That is, the terminal 120 may not include the panel-related information in the UE capability signal and transmit the same to the base station 110. In this case, the base station 110 may not obtain information regarding the total number of panels included in the terminal 120, the maximum number of panels that are simultaneously operable by the terminal 120, and information regarding a reception beam that may be generated by each panel. Therefore, when the panel-related information is not included in the UE capability signal, the base station 110 may determine that a panel change of the terminal 120 is not necessary and may terminate the process. For example, in the case of a terminal using a single panel, because there is no extra panel for the panel change, the panel-related information may not be included in the UE capability signal. As another example, in the case of a terminal for activating all panels and receiving/transmitting signals, because a panel change gap, which is a time taken to activate a certain panel, is unnecessary, the panel-related information may not be included in the UE capability signal.

On the other hand, when the panel-related information is included in the UE capability signal (S530, YES), the base station 110 may determine whether information regarding the number of panels simultaneously operable is included in the UE capability signal in operation S540. For example, the base station 110 may receive and decode the UE capability signal and obtain information regarding a panel of the terminal 120 that is RRC-connected. According to an embodiment, the base station 110 may fail to obtain the information regarding the maximum number of panels that are simultaneously operable by the terminal 120. For example, the terminal 120 may omit the information regarding the maximum number of panels simultaneously operable and may transmit only the information regarding the number of panels of the terminal 120, thereby implicitly notifying the base station 110 of the maximum number of panels simultaneously operable.

When information regarding the number of panels simultaneously operable is not included in the UE capability signal (S540, NO), operation S550 is performed. In operation S550, the base station 110 may determine that the terminal 120 is a terminal capable of simultaneously operating all panels. That is, when only the information regarding the number of panels of the terminal 120 is obtained, the base station 110 may determine that the maximum number of panels simultaneously operable is identical to the number of panels of the terminal 120 because the number of panels of the terminal 120 is identical to the maximum number of panels simultaneously operable when the terminal 120 may simultaneously operate all panels.

On the other hand, when information regarding the number of panels simultaneously operable is included in the UE capability signal (S540, YES), operation S560 is performed. In operation S560, the base station 110 may generate a panel change signal. When the current base station 110 changes a transmission beam, the panel change signal may indicate a signal for instructing an optimum reception beam corresponding to a changed transmission beam to the terminal 120. For example, referring to FIG. 3A and FIG. 5, it is assumed that first to third beams may be formed in the first panel 310-1 and fourth to sixth beams may be formed in the second panel 310-2. The base station 110 may transmit, to the terminal 120, a request for changing a reception beam from the first beam to the fifth beam. To enable the terminal 120 to change the reception beam from the first beam to the fifth beam, a panel change, in which the first panel 310-1 is inactivated and the second panel 310-2 is activated, needs to be performed. Therefore, the base station 110 may generate a panel change signal and transmit the panel change signal to the terminal 120. A detailed description of the panel change signal will be described below.

Figure 6:
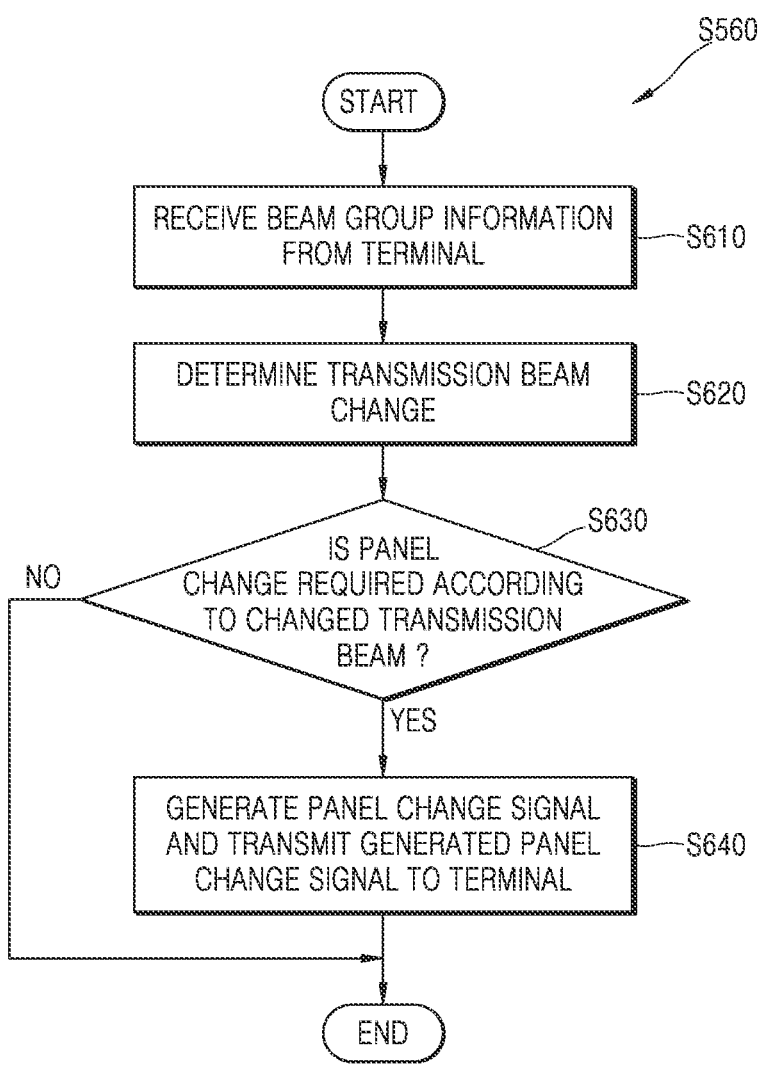
FIG. 6 is a flowchart of an operation of a base station, according to example embodiments.

FIG. 6 is a flowchart of an operation of a base station, according to example embodiments.

Referring to FIG. 6, in operation S610, the base station 110 may receive beam group information from the terminal 120. The beam group information may include information regarding reception beams that may be generated by the terminal 120. For example, the beam group information may be information regarding beams that may be generated in each panel. The beam group information may correspond to a lookup table in which the beams that may be generated in each panel are stored.

In operation S620, the base station 110 may determine a transmission beam change. The base station 110 may change the transmission beams received by the terminal 120. For example, the base station 110 may determine to change an existing first transmission beam to a second transmission beam. An optimum reception beam corresponding to the first transmission beam may be a first beam of the terminal 120. An optimum reception beam corresponding to the second transmission beam may be a fifth beam of the terminal 120.

In operation S630, the base station 110 may determine whether a panel change is required according to the changed transmission beam. Referring to the example illustrated in FIG. 3A, the first beam of the terminal 120 may be generated by the first panel 310-1, and the fifth beam of the terminal 120 may be generated by the second panel 310-2. Therefore, the base station 110 may determine that there is a request for changing the first panel 310-1 to the second panel 310-2.

According to an embodiment, when there is no need to change the panel of the terminal 120 according to the changed transmission beam (S630, NO), the base station 110 may terminate the process. For example, the base station 110 may change the transmission beam received by the terminal 120 from the first transmission beam to a third transmission beam. The optimum reception beam corresponding to the first transmission beam may be the first beam of the terminal 120, and the optimum reception beam corresponding to the third transmission beam may be the second beam of the terminal 120. Referring to the example illustrated in FIG. 3A, the first and second beams of the terminal 120 are both generated by the first panel 310-1, and thus the terminal 120 may not change the panel and only change the reception beam, thus communicating with the base station 110.

On the other hand, when a panel change is required (S630, YES), operation S640 may be performed. In operation S640, the base station 110 may generate a panel change signal and transmit the panel change signal to the terminal 120. According to an embodiment, the panel change signal may include at least one of beam index information (or group index information) of a transmission beam currently communicating with the base station 110, beam index information (or group index information) of a transmission beam to be changed, a start point in time of a panel change gap, and a termination point in time of the panel change gap (or length information of the panel change gap).

Figure 7A:
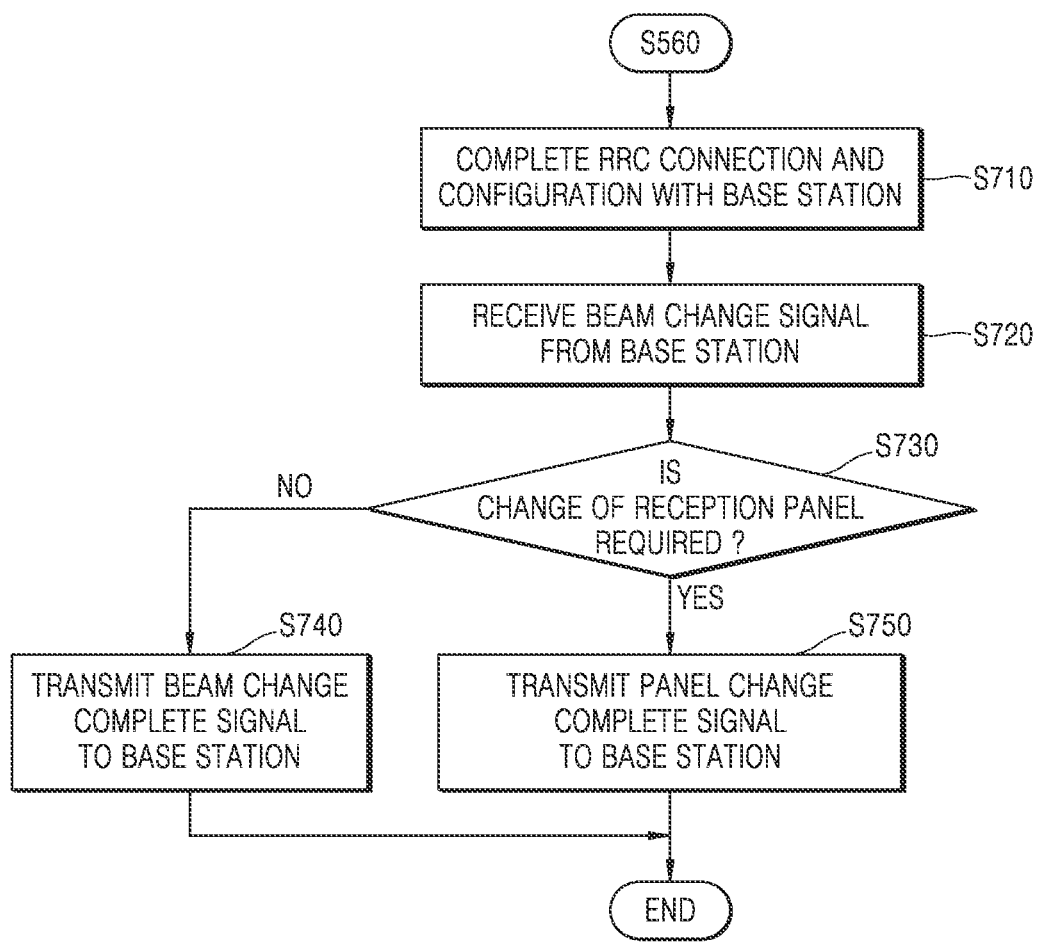
FIG. 7A is a flowchart of an operation of a terminal, according to example embodiments.

FIG. 7A is a flowchart of an operation of a terminal, according to example embodiments.

Referring to FIG. 7A, in operation S710, the terminal 120 may complete the RRC connection and configuration with the base station 110. Operation S710 may be understood with reference to the descriptions regarding operation S510 of FIG. 5 and thus a repeated description thereof is omitted for conciseness.

In operation S720, the terminal 120 may receive a beam change signal from the base station 110. The beam change signal may instruct a change of a transmission beam transmitted by the base station 110. For example, the beam change signal may include beam index information or beam group index information of a transmission beam to be changed.

In operation S730, the terminal 120 may determine whether there is a need for a reception panel change. For example, the beam change signal may include index information to instruct a change of the transmission beam of the base station 110 from the first transmission beam to the second transmission beam. An optimum reception beam corresponding to the first transmission beam may be a first reception beam, and an optimum reception beam corresponding to the second transmission beam may be a fifth reception beam. The terminal 120 may identify that there is a need for a panel change from the first panel 310-1, which is used to form the first reception beam, to the second panel 310-2, which is used to form the fifth reception beam. As another example, the terminal 120 may include index information to instruct the change of the transmission beam of the base station 110 from the first transmission beam to the third transmission beam. An optimum reception beam corresponding to the first transmission beam may be the first reception beam, and an optimum reception beam corresponding to the third transmission beam may correspond to the second reception beam. Because the terminal 120 may generate both the first reception beam and the second reception beam by using the first panel 310-1 that has been activated, the terminal 120 may determine that there is no need for the panel change.

When it is determined that a reception panel change is not required (S730, NO), operation S740 may be performed. In operation S740, the terminal 120 may transmit a beam change complete signal to the base station 110. That is, when it is determined in operation S730 that there is no need for a reception panel change, the terminal 120 may generate the beam change complete signal. The beam change complete signal may be a signal for instructing that the reception beam has changed in the terminal 120. The base station 110 may implicitly identify that the panel is not changed in the terminal 120, in response to the reception of the beam change complete signal.

When it is determined that a reception panel change is required (S730, YES), operation S750 may be performed. In operation S750, the terminal 120 may transmit the panel change complete signal to the base station 110. That is, when the base station 110 receives the panel change complete signal, the base station 110 may identify that the terminal 120 has completed the panel change and the beam is changed to an optimum reception beam.

Figure 7B:
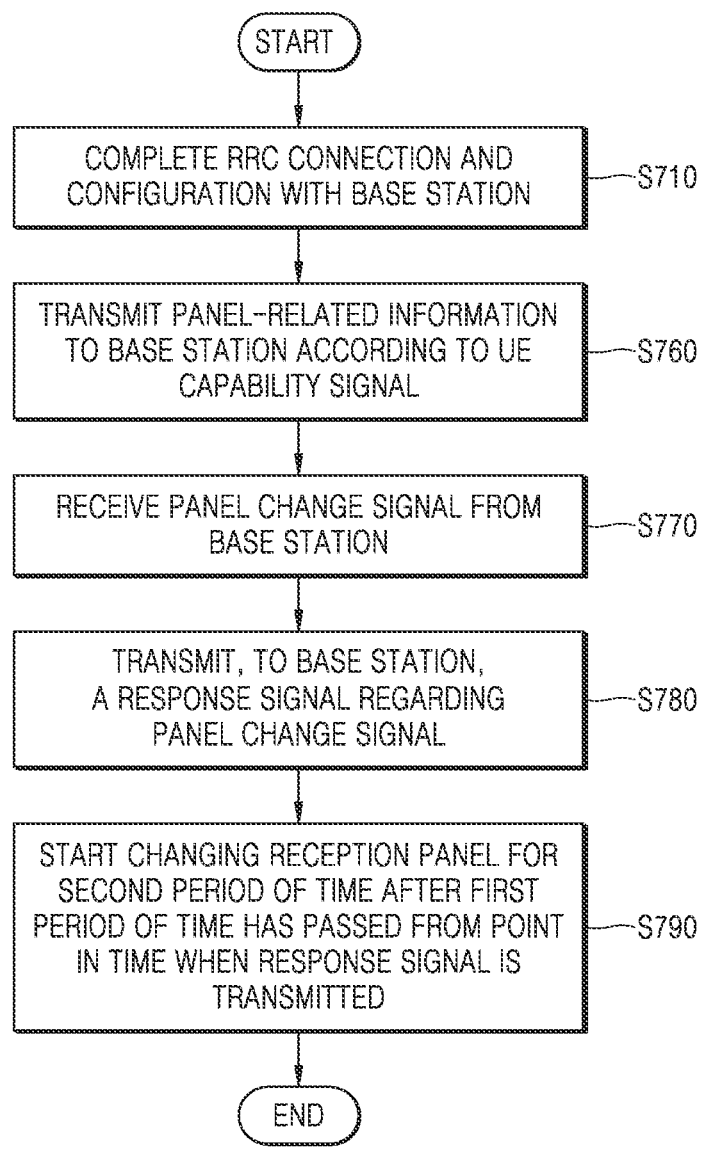
FIG. 7B is a flowchart of an operation of a terminal, according to example embodiments.

FIG. 7B is a flowchart of an operation of a terminal, according to example embodiments.

Referring to FIG. 7B, in operation S710, the terminal 120 may complete the RRC connection and configuration with the base station 110. Operation S710 may be understood with reference to the descriptions regarding operation S510 of FIG. 5 and therefore a repeated description thereof is omitted for conciseness.

In operation S760, the terminal 120 may transmit, to the base station 110, the panel-related information according to the UE capability signal. The panel-related information may include at least one of whether the terminal 120 requires a panel change gap, the number of panels included in the terminal 120, the maximum number of panels that are simultaneously operable by the terminal 120, length information of the panel change gap, and beam group information of the terminal 120.

In operation S770, the terminal 120 may receive the panel change signal from the base station 110. The panel change signal may be a signal for instructing a change of a reception panel that is currently operated by the terminal 120. According to an embodiment, the panel change signal may include at least one of beam index information (or group index information) of a transmission beam currently communicating with the base station 110, beam index information (or group index information) of a transmission beam to be changed, a start point in time of a panel change gap, and a termination point in time (or length information of the panel change gap) of the panel change gap.

In operation S780, the terminal 120 may transmit a response signal regarding the panel change signal to the base station 110. The response signal may include one of an ACK signal and a NACK signal. For example, when the terminal 120 successfully performs decoding by receiving the panel change signal, the terminal 120 may transmit an ACK signal to the base station 110. When the terminal 120 fails to receive the panel change signal, the terminal 120 may transmit a NACK signal to the base station 110.

In operation S790, the terminal 120 may start changing the reception panel after a first period of time has passed from a point in time, when the response signal is transmitted to the base station 110, and may change the reception panel during a second period of time. In other words, the terminal 120 may wait for a first period of time to elapse after the response signal is transmitted, and then change the reception panel during a second period of time after the first period of time has elapsed. The terminal 120 may determine a point in time when the panel change starts, based on the start point in time of the panel change gap that is obtained in operation S770. For example, information to instruct the start point in time may be the number of slots. The terminal 120 may identify that the reception panel change starts in a point in time when the above number of slots has passed from a slot in which the ACK signal is transmitted. Similar to the information to instruct the start point in time, information to instruct the termination point in time may also be the number of slots. For example, the terminal 120 may terminate the panel change when the number of slots included in the information, which is used to instruct the termination point in time, has passed from the slot in which the ACK signal is transmitted. As another example, the terminal 120 may determine the panel change when the number of slots included in the information, which is used to instruct the termination point in time, has passed from a slot in which the panel change starts. In the embodiments described above, units of information to instruct either the start point in time or the termination point in time are slots, but embodiments are not limited thereto. According to various embodiments, the start point in time, the termination point in time, and the length of the panel change gap may be in units of symbols or in time units having absolute values. For example, the start point in time, the termination point in time, and the length of the panel change gap may be in a millisecond unit.

According to various embodiments, the panel change signal may only include information regarding the start point in time. When the terminal 120 may decode the panel change signal and obtain only the information regarding the start point in time, and when the terminal 120 fails to obtain information regarding the termination point in time or the length of the panel change gap, the terminal 120 may maintain the panel change gap until the terminal 120 receives a panel change termination signal from the base station 110. That is, for example, when the base station 110 does not include the information regarding the termination point in time and the length of the panel change gap when the panel change signal is generated, the base station 110 has to generate a panel change termination signal for instructing the termination of the panel change and transmit the panel change termination signal to the terminal 120.

Figure 7C:
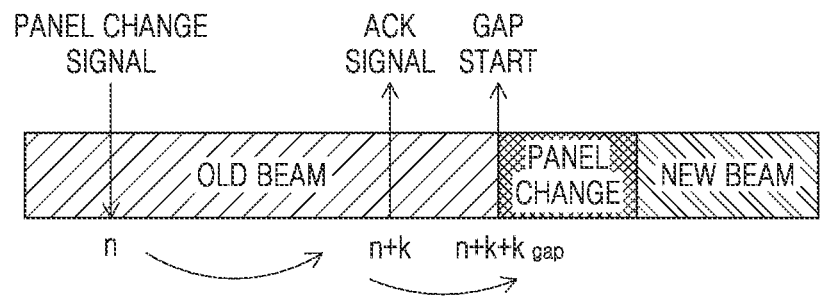
FIG. 7C illustrates a time flow of a terminal according to example embodiments.

Referring together to FIG. 7C illustrating a time flow of the terminal 120, the terminal 120 may receive the panel change signal from the base station 110 in an $n^{th}$ slot point in time. The terminal 120 may decode the panel change signal during a k slot time from an $n^{th}$ slot and may transmit an ACK signal to the base station 110 from an $(n+k)^{th}$ slot time. The terminal 120 may start the panel change in a point in time when a predetermined slot has passed from a slot in which the ACK signal is transmitted to the base station 110. For example, the information to instruct the start point in time of the panel change may include a $k_{gap}$ value. The terminal 120 may start the panel change after a time at which a $k_{gap}$ slot has passed from the point in time when the ACK signal is transmitted to the base station 110.

Figure 8:
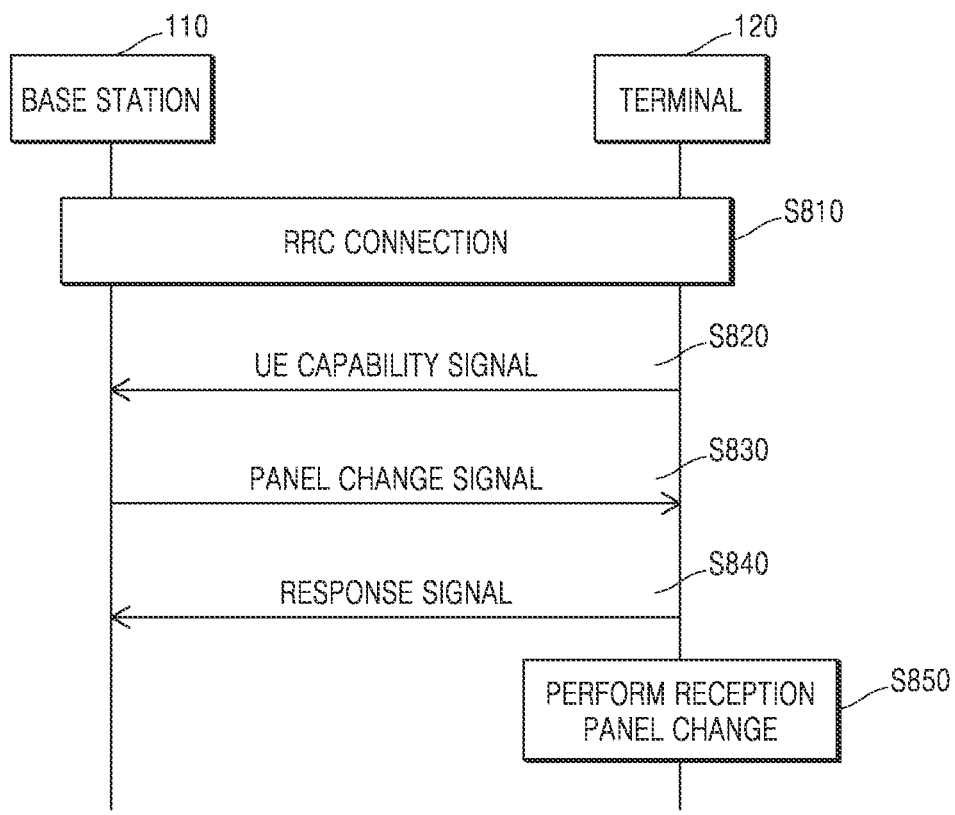
FIG. 8 illustrates a signal exchange between a base station and a terminal, according to example embodiments.

FIG. 8 illustrates a signal exchange between a base station and a terminal, according to example embodiments.

Referring to FIG. 8, in operation S810, RRC connection between the terminal 120 and the base station 110 may be made. The terminal 120 may transmit an RRC connection request message to the base station 110 to request the RRC connection. The base station 110 may transmit an RRC connection setup message to the terminal 120 in response to the RRC connection request message and assign a Signaling Radio Bearer (SRB) configuration resource for the terminal 120. The terminal 120 may transmit an RRC connection setup complete message to the base station 110 to complete the RRC connection.

In operation S820, the terminal 120 may transmit the UE capability signal to the base station 110. The UE capability signal may include the panel-related information, and the panel-related information may include at least one of beam group information regarding reception beams that may be generated by respective panels of the terminal 120, whether the panel change gap is required, the number of panels included in the terminal 120, the maximum number of panels that are simultaneously operable by the terminal 120, and length information of the panel change gap.

In operation S830, the base station 110 may transmit the panel change signal to the terminal 120. When the transmission beam is currently changed in the base station 110, the panel change signal may denote a signal for instructing, to the terminal 120, an optimum reception beam corresponding to the changed transmission beam. The panel change signal may at least include information regarding a start point in time when the panel change is made by the terminal 120 and a termination point in time when the panel change has to be completed.

In operation S840, the terminal 120 may transmit a response signal regarding the panel change signal to the base station 110. For example, the response signal may be one of an ACK signal and a NACK signal described above. For example, the terminal 120 may transmit the ACK signal regarding the panel change signal to the base station 110 in operation S840 and may perform the reception panel change in operation S850, based on information regarding a start point in time and a termination point in time when the panel change signal is decoded and obtained.

Figure 9:
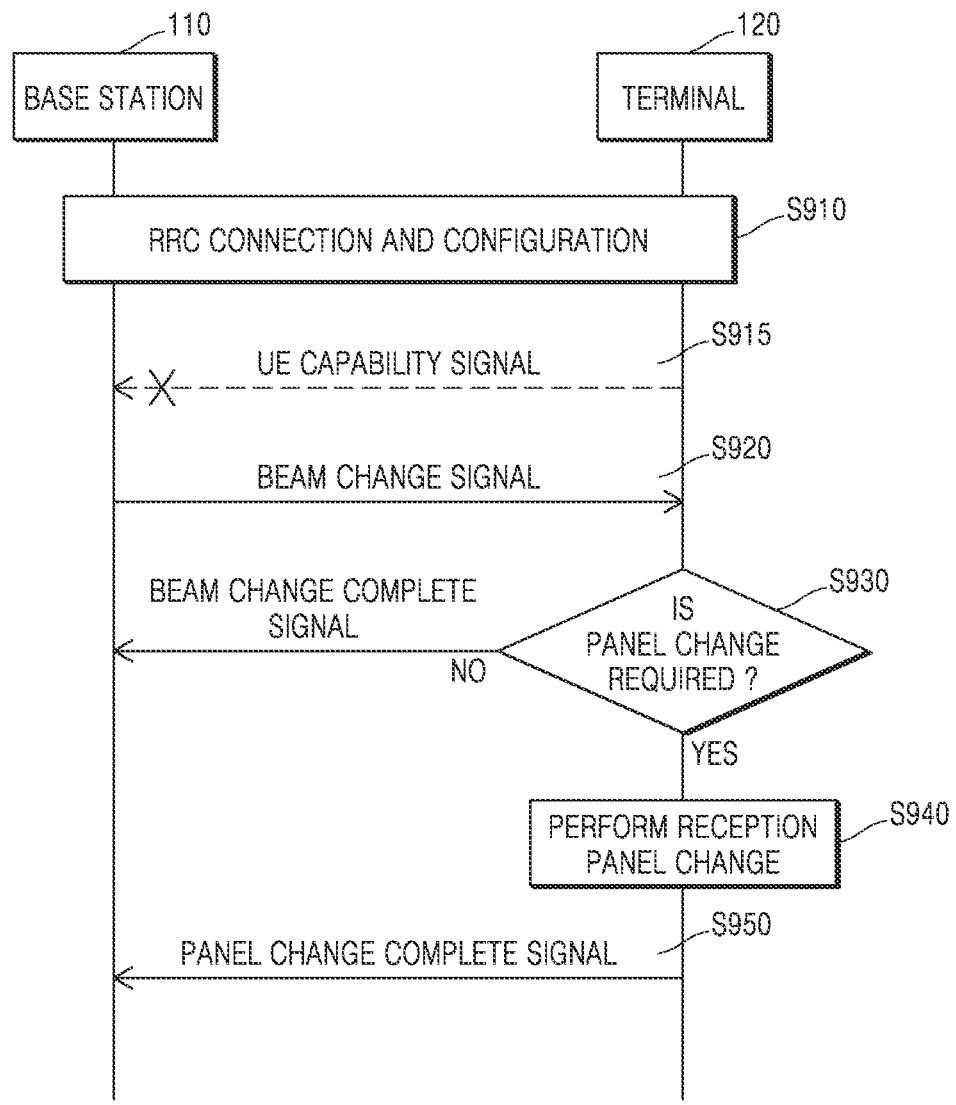
FIG. 9 illustrates a signal exchange between a base station and a terminal, according to example embodiments.

FIG. 9 illustrates a signal exchange between a base station and a terminal, according to example embodiments.

Referring to FIG. 9, in operation S910, the RRC connection between the terminal 120 and the base station 110 may be made. Descriptions regarding operation S910 may be the same as the descriptions regarding operation S810 and therefore a repeated description thereof is omitted for conciseness. In operation S915, the terminal 120 may bypass to transmit the UE capability signal to the base station 110. The terminal 120 may generate the panel-related information, and may determine not to transmit the panel-related information to the base station 110.

In operation S920, the base station 110 may transmit a beam change signal to the terminal 120. In an embodiment, the base station 110 may not receive the UE capability signal from the terminal 120. Because the base station 110 may not obtain beam group information of the terminal 120 by decoding the UE capability signal, the base station 110 may transmit, to the terminal 120, the beam change signal instead of the panel change signal. The beam change signal may instruct a change of a transmission beam transmitted by the base station 110. For example, the beam change signal may include beam index information or beam group index information of a transmission beam to be changed by the base station 110.

In operation S930, the terminal 120 may determine whether a panel has to be changed, and when there is no need for the panel change (operation S930, NO), the beam change complete signal may be transmitted to the terminal 120. The terminal 120 may determine a reception beam by referring to transmission beam index information included in a beam change signal transmitted by the base station 110. When the reception beam is determined, the terminal 120 may determine whether the determined reception beam may be formed using a currently activated panel. Because a panel change is not required when the determined reception beam may be formed using the currently activated panel, the terminal 120 may change the transmission beam to an optimum reception beam and may transmit the beam change complete signal to the base station 110.

When a panel change is required (S930, YES), the terminal 120 may perform the panel change in operation S940 and transmit a panel change complete signal to the base station 110 in operation S950. Because the panel change is required when the determined reception beam may not be formed using the currently activated panel, the terminal 120 may complete the panel change and transmit the beam change complete signal to the base station 110. The beam change complete signal may include at least one of index information to indicate a changed panel or group index information regarding transmission beams that may be received by the changed panel.

Figure 10:
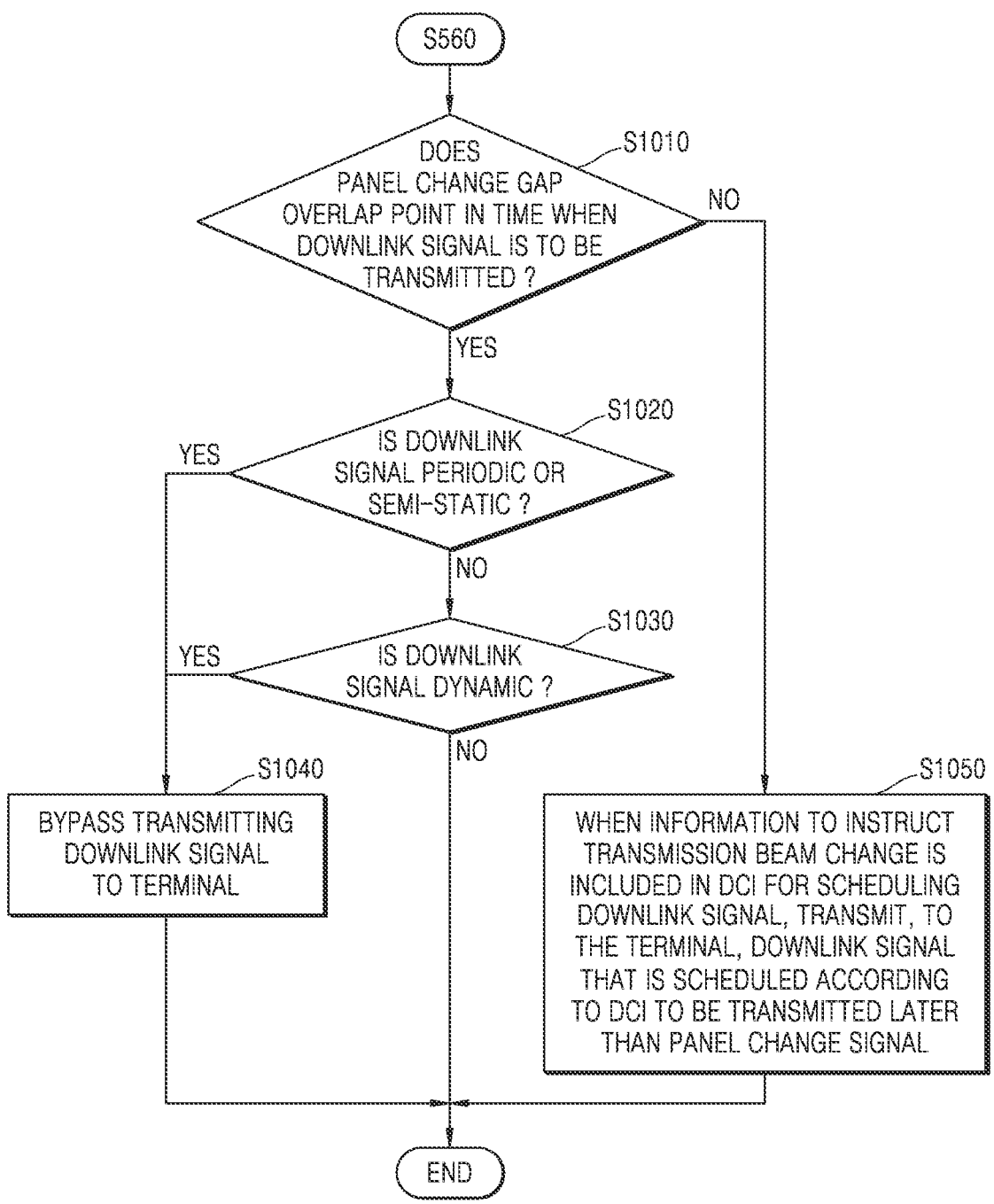
FIG. 10 is a flowchart of an operation of a base station in a panel exchange gap, according to example embodiments.
Figure 11A:
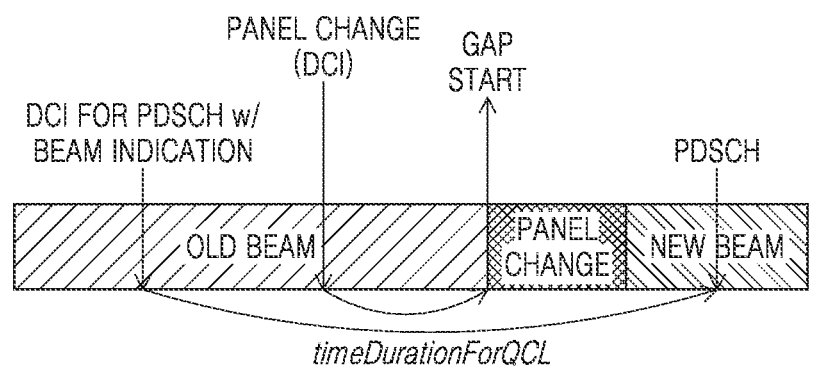
FIGS. 11A and 11B illustrate time flows of a terminal according to example embodiments.
Figure 11B:
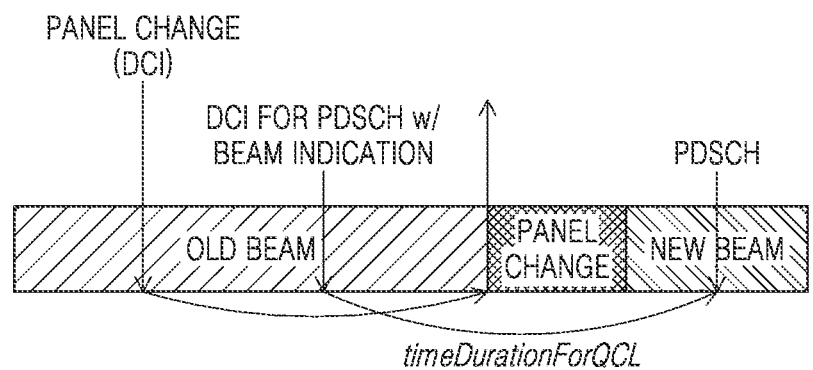

FIG. 10 is a flowchart of an operation of a base station in a panel change gap, according to example embodiments, and FIGS. 11A and 11B illustrate a time flow of a terminal according to example embodiments.

Referring to FIGS. 10 and 11A, in operation S1010, the base station 110 may determine whether the panel change gap overlaps a point in time when a downlink signal is to be transmitted to the terminal 120. According to an embodiment, the base station 110 may transmit the downlink signal to the terminal 120 after the panel change signal is transmitted to the terminal 120 (see FIG. 5, operation S560). Because the base station 110 instructs, to the terminal 120, the start and termination points in time of the panel change, the base station 110 may compare whether a point in time, when a pre-scheduled downlink signal is to be transmitted, is included in the start and termination points in time of the panel change.

When the panel change gap overlaps the point in time when the downlink signal is to be transmitted (operation S1010, YES), the base station 110 may determine whether the downlink signal is periodic or semi-static in operation S1020. A periodic or semi-static downlink signal may be a signal transmitted to the terminal 120, regardless of the panel change signal. For example, the periodic or semi-static downlink signal may include at least one of a Semi Persistent Scheduling (SPS) Physical Downlink Shared Channel (PDSCH) or a Channel State Information-Reference Signal (CSI-RS). When a downlink signal is periodic or semi-static (operation S1020, YES), the base station 110 may bypass transmitting the downlink signal to the terminal 120 in operation S1040. For example, the base station 110 may bypass and drop the transmission of the periodic or semi-static downlink signal to the terminal 120. The terminal 120 thus may not respond to the downlink signal. For example, when the downlink signal is PDSCH, the terminal 120 thus may not respond with an ACK signal or a NACK signal regarding the PDSCH. For example, when the downlink signal is a CSI-RS, the terminal 120 may not transmit channel state information to the base station 110.

When the downlink signal is not periodic or semi-static (operation S1020, NO), the base station 110 may determine whether the downlink signal is dynamic in operation S1030. A dynamic downlink signal may be a downlink signal that is dynamically scheduled according to a PDCCH and/or a downlink control indicator (DCI) and transmitted. For example, the dynamic downlink signal may include at least one of PDSCH and an aperiodic CSI-RS. When a downlink signal transmitted to the panel change gap is dynamic (operation S1030, YES), the base station 110 may bypass transmitting the downlink signal to the terminal 120. For example, the base station 110 may bypass and drop the transmission of the dynamic downlink signal to the terminal 120. The terminal 120 may not respond to the downlink signal. The For example, when the downlink signal is PDSCH, the terminal 120 may not respond to the ACK signal or the NACK signal regarding the PDSCH. For example, when the downlink signal is a CSI-RS, the terminal 120 may not transmit the channel state information to the base station 110.

When the panel change gap does not overlap the point in time when the downlink signal is to be transmitted (operation S1010, NO), when the information to instruct the transmission beam change is included in the DCI for scheduling the downlink signal, the base station 110 may transmit, to the terminal 120, a downlink signal that is scheduled according to DCI to be transmitted later than the panel change signal in operation S1050. For example, the base station 110 may identify that the point in time, when the downlink signal is to be transmitted, does not overlap the panel change gap. For example, when a point in time, when the downlink signal scheduled according to the DCI is to be transmitted, is after the termination point in time of the panel change, the panel change gap may not overlap the point in time when the downlink signal is to be transmitted.

According to an embodiment, the base station 110 may transmit, to the terminal 120, the DCI for scheduling the downlink signal by including the information, which is used to instruct the transmission beam change, in the DCI for scheduling the downlink signal. The transmission beam change may be used to instruct that a transmission beam for transmitting the DCI is different from a transmission beam for transmitting the scheduled downlink signal. For example, the base station 110 may transmit the DCI according to the first transmission beam, and the downlink signal scheduled according to the DCI may be transmitted to the terminal 120 according to the second transmission beam.

According to an embodiment, the base station 110 may transmit, to the terminal 120, the downlink signal that is scheduled according to the DCI to be transmitted later than the panel change signal. Referring to FIG. 11A, the panel change signal may be transmitted later than the DCI for scheduling the downlink signal. For example, the DCI for scheduling the downlink signal may include the information to instruct the transmission beam change, and the DCI may be transmitted to the first transmission beam, and the downlink signal may be transmitted to the second transmission beam. The panel change signal, which is transmitted later than the DCI, may be used to instruct the activation of a panel that is not covered by the second transmission beam. For example, the panel change signal may be used to indicate a panel, which is to be changed, as the second panel 310-2, and the second transmission beam may be received by a reception beam group of the first panel 310-1. That is, when the panel change is completed, the activated panel may be the second panel 310-2, and because the downlink signal scheduled according to the DCI is transmitted according to the second transmission beam, reception/transmission errors may occur. Therefore, the base station 110 may drop the transmission of the downlink signal, and the terminal 120 thus may not respond to the downlink signal as well. For example, when the downlink signal is PDSCH, the terminal 120 may not respond to the ACK signal or the NACK signal regarding the PDSCH. For example, when the downlink signal is a CSI-RS, the terminal 120 may not transmit the channel state information to the base station 110.

Referring to FIG. 11B, the panel change signal may be transmitted before the DCI for scheduling the downlink signal. For example, the panel change signal may indicate a panel, which is to be changed, as the second panel 310-2.

That is, after the panel change is completed, the terminal 120 may activate the second panel 310-2. When the DCI for scheduling the downlink signal includes the information to instruct the transmission beam change, the base station 110 may indicate any one of the transmission beams covered by a panel to be activated in a point in time when the downlink signal is to be transmitted. Therefore, when the panel change signal is transmitted first and then DCI for instructing the transmission beam change is transmitted, the base station 110 may not drop the downlink signal and transmit the same to the terminal 120, and the terminal 120 may respond to the downlink signal. For example, when the downlink signal is PDSCH, the terminal 120 may transmit, to the base station 110, the ACK signal or the NACK signal regarding the PDSCH, and when the downlink signal is a CSI-RS, the terminal 120 may transmit the channel state information to the base station 110.

According to various embodiments, it is described that the base station 110 transmits a panel change signal to the terminal 120 once, but embodiments are not limited thereto. According to various embodiments, after a first panel change signal for instructing a panel change to the second panel 310-2 is transmitted to the terminal 120, the base station 110 may transmit a second panel change signal for instructing a panel change to the third panel 310-3 again, before the panel change is completed. Priorities may be set according to types of DCI including a panel change signal. When a priority of DCI for the first panel change signal is lower than that of DCI for the second panel change signal, the terminal 120 may activate a panel according to the second panel change signal transmitted late. According to an embodiment, the priorities of DCI may be defined depending on a DCI application range. Broadcast/multicast DCI, which includes relatively important control information regarding all cells or a terminal group, may be prioritized over unicast DCI. According to other embodiments, the priorities may be differently defined according to RNTI in which the DCI is scrambled. For example, DCI scrambled according to CS-RNTI, may have a higher priority than DCI scrambled according to C-RNTI.

While various embodiments have been particularly shown and described with reference to the drawings, it will be understood that various changes in form and details may be made therein without departing from the spirit and scope of the following claims.

What is claimed is:

1. An operating method of a base station, the operating method comprising:
   receiving, from a terminal, a user equipment (UE) capability signal comprising panel-related information of the terminal;
   determining whether to generate a panel change signal based on the panel-related information;
   determining a panel change of the terminal based on the panel-related information, when it is determined to generate the panel change signal; and
   transmitting, to the terminal, the panel change signal comprising information regarding the panel change,
   wherein the panel-related information comprises length information of a panel change gap and the length information of the panel change gap comprises:
   information to instruct a start point in time when the terminal starts the panel change and a termination point in time of the panel change; or
   length information regarding the start point in time when the terminal starts the panel change and a gap for the panel change.

2. The operating method of claim 1, wherein the panel-related information further comprises at least one of a number of panels in the terminal, a maximum number of panels that are simultaneously operable by the terminal, or beam group information of the terminal.

3. The operating method of claim 2, wherein the panel-related information comprises the number of panels in the terminal and the maximum number of panels that are simultaneously operable by the terminal, and
   wherein the determining whether to generate the panel change signal based on the panel-related information comprises,
   when the terminal comprises one panel or when the number of panels in the terminal is identical to the maximum number of panels that are simultaneously operable by the terminal, bypassing generating the panel change signal.

4. The operating method of claim 2, wherein the panel-related information comprises the beam group information of the terminal, and
   wherein the determining of the panel change of the terminal based on the panel-related information comprises:
   identifying a first panel for forming a plurality of reception beams corresponding to a first transmission beam of the base station, based on the beam group information of the terminal;
   identifying a second panel for forming a plurality of reception beams corresponding to a second transmission beam of the base station, based on the beam group information of the terminal, the second transmission beam being different from the first transmission beam; and
   when the first panel is different from the second panel, determining the panel change of the terminal based on the first panel and the second panel.

5. The operating method of claim 1, further comprising determining whether the panel change gap overlaps a point in time when a downlink signal is to be transmitted to the terminal; and
   when the panel change gap overlaps the point in time when the downlink signal is to be transmitted, bypassing transmitting the downlink signal to the terminal.

6. The operating method of claim 5, wherein the downlink signal comprises a periodic or semi-static signal, the periodic or semi-static signal including at least one of a Semi Persistent Scheduling (SPS) Physical Downlink Shared Channel (PDSCH) or a Channel State Information-Reference Signal (CSI-RS), or
   the downlink signal comprises a dynamic signal including at least one of a PDSCH or an aperiodic CSI-RS.

7. The operating method of claim 5, further comprising:
   when the panel change gap does not overlap the point in time when the downlink signal is to be transmitted, determining whether there is a downlink signal that is scheduled according to a downlink control indicator (DCI) to be transmitted later than the panel change signal; and
   transmitting, to the terminal, the downlink signal scheduled according to the DCI to be transmitted later,
   wherein the DCI comprises information regarding a transmission beam change of the base station.

8. The operating method of claim 1, wherein the panel-related information further comprises a number of panels in the terminal, a maximum number of panels that are simultaneously operable by the terminal, and beam group information of the terminal.

9. An operating method of a terminal, the operating method comprising:
- transmitting, to a base station, a UE capability signal comprising panel-related information of the terminal;
- receiving, from the base station, a panel change signal comprising index information to indicate a panel to be changed and information regarding a panel change gap; and
- changing a reception panel that is activated in the panel change gap, based on the panel change signal,
- wherein the information regarding the panel change gap comprises:
- information to instruct a start point in time at which the terminal starts a panel change, and a termination point in time of the panel change, or
- length information regarding the start point in time and a gap required for the panel change.

10. The operating method of claim 9, wherein the panel-related information comprises at least one of a number of panels in the terminal, a maximum number of panels that are simultaneously operable by the terminal, length information of the panel change gap, or beam group information of the terminal.

11. The operating method of claim 10, further comprising:
- transmitting, to the base station, a response signal in response to the panel change signal.

12. The operating method of claim 10, further comprising receiving a downlink signal from the base station,
- wherein the downlink signal comprises a periodic or semi-static signal, the periodic or semi-static signal including at least one of a Semi Persistent Scheduling (SPS) Physical Downlink Shared Channel (PDSCH) or a Channel State Information-Reference Signal (CSI-RS), or
- the downlink signal comprises a dynamic signal including at least one of a PDSCH or an aperiodic CSI-RS.

13. An operating method of a terminal, the operating method comprising:
- bypassing transmitting a UE capability signal, which comprises panel-related information of the terminal, to a base station;
- receiving, from the base station, a beam change signal comprising a transmission beam change;
- determining whether there is a need for a panel change, in response to the beam change signal; and
- when it is determined that the panel change is required, performing the panel change and transmitting a panel change complete signal to the base station,
- wherein the beam change signal is used to instruct, the base station, to change a transmission beam from a first transmission beam to a second transmission beam.

14. The operating method of claim 13, wherein the panel-related information comprises at least one of a number of panels in the terminal, a maximum number of panels that are simultaneously operable by the terminal, length information of a panel change gap, and beam group information of the terminal.

15. The operating method of claim 13, wherein the determining of whether there is a need for the panel change, in response to the beam change signal comprises:
- identifying a first panel for forming a plurality of reception beams corresponding to the first transmission beam, based on beam group information of the terminal;
- identifying a second panel for forming a plurality of reception beams corresponding to the second transmission beam, based on the beam group information of the terminal; and
- when the first panel is different from the second panel, determining the panel change of the terminal.

16. The operating method of claim 15, further comprising, when the first panel is a same as the second panel, determining not to perform the panel change and transmitting a beam change complete signal to the base station.

17. The operating method of claim 13, wherein the panel change complete signal at least comprises index information to instruct a panel activated according to the panel change and group index information of a transmission beam that is received by the activated panel.

18. The operating method of claim 13, further comprising:
- receiving a downlink signal from the base station in a panel change gap; and
- bypassing transmitting a response signal to the base station, in response to the downlink signal.

19. The operating method of claim 18, wherein the downlink signal comprises a periodic or a semi-static signal at least comprising a Semi Persistent Scheduling (SPS) Physical Downlink Shared Channel (PDSCH) and a Channel State Information-Reference Signal (CSI-RS) and a dynamic signal at least comprising PDSCH and an aperiodic CSI-RS.

* * * * *

UNITED STATES PATENT AND TRADEMARK OFFICE
CERTIFICATE OF CORRECTION

| | | |
|---|---|---|
| PATENT NO. | : 12,149,320 B2 | Page 1 of 1 |
| APPLICATION NO. | : 17/734259 | |
| DATED | : November 19, 2024 | |
| INVENTOR(S) | : Kunil Yum, Yangsoo Kwon and Jungmin Park | |

It is certified that error appears in the above-identified patent and that said Letters Patent is hereby corrected as shown below:

On the Title Page

Column 1, Item (30) Foreign Application Priority Data:
Please add --May 3, 2021 (KR)...............10-2021-0057476--

Signed and Sealed this
Eighth Day of April, 2025

Coke Morgan Stewart
*Acting Director of the United States Patent and Trademark Office*